Figure 1:
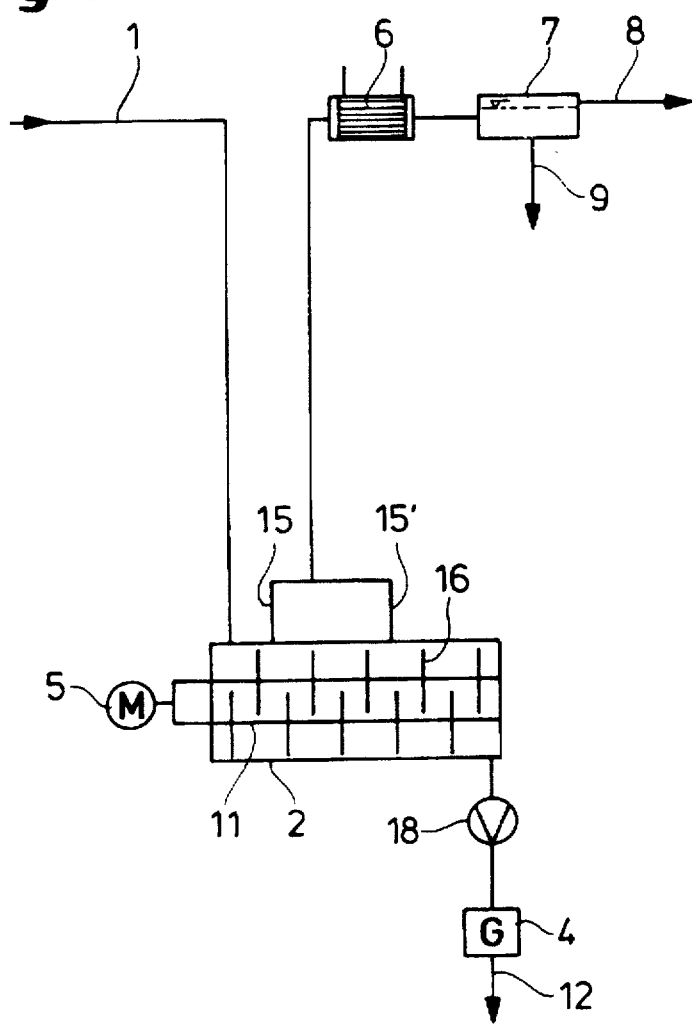

United States Patent [19]
Wulff et al.

[11] Patent Number: 5,786,445
[45] Date of Patent: Jul. 28, 1998

[54] PROCESS FOR DRYING POLYMERIC POWDERS AND POLYMERIC AGGLOMERATES

[75] Inventors: Claus Wulff, Krefeld; Gottfried Zaby, Leverkusen; Thomas Bamberger, Duisburg; Klemens Kohlgrüber, Kürten; Hugo Obermann, Dormagen, all of Germany; Stefaan De Vos, Gravenwezel, Belgium; Gabriel Denecker, Heide-Kalmthout, Belgium; Johan Vaes, Kalmthout, Belgium; Tony Van Osselaer, Belsele, Belgium

[73] Assignee: Bayer Aktiengesellschaft, Germany

[21] Appl. No.: 724,931

[22] Filed: Oct. 2, 1996

[30] Foreign Application Priority Data

Oct. 5, 1995 [DE] Germany ............... 195 37 114.3

[51] Int. Cl.$^6$ ............................................ C08F 6/00
[52] U.S. Cl. ............... 528/500; 528/502 R; 528/503; 264/14; 264/45.7; 264/80; 264/204
[58] Field of Search ............... 528/500, 501, 528/502 R, 503; 264/14, 45.7, 80, 204

[56] References Cited

U.S. PATENT DOCUMENTS

| | | |
|---|---|---|
| 3,799,234 | 3/1974 | Skidmore . |
| 4,909,898 | 3/1990 | Pasdiya et al. . |
| 4,921,909 | 5/1990 | Sugimori et al. . |
| 5,041,249 | 8/1991 | Yehl . |
| 5,047,188 | 9/1991 | Okada et al. . |
| 5,407,266 | 4/1995 | Rötsch et al. ............... 366/97 |

FOREIGN PATENT DOCUMENTS

| | | |
|---|---|---|
| 0 027 700 | 4/1981 | European Pat. Off. . |
| 0 267 531 | 5/1988 | European Pat. Off. . |
| 0 300 485 | 1/1989 | European Pat. Off. . |
| 0 435 023 | 7/1991 | European Pat. Off. . |
| 0 460 466 | 12/1991 | European Pat. Off. . |
| 0 528 210 | 2/1993 | European Pat. Off. . |
| 1 404 237 | 4/1969 | Germany . |
| 60-184814 | 9/1985 | Japan . |
| 01249834 | 10/1985 | Japan . |
| 61-221225 | 10/1986 | Japan . |
| 62-294528 | 12/1987 | Japan . |
| 6216905 | 8/1994 | Japan . |

*Primary Examiner*—Duc Truong
*Attorney, Agent, or Firm*—Connolly & Hutz

[57] ABSTRACT

The invention relates to a process for drying polymeric powders and polymeric agglomerates, in particular thermoplastic aromatic polycarbonate or other thermoplastic polymers such as, for example, acrylonitrile-butadiene-styrene copolymer, in the melt, whereby thermoplastic polymeric powders or polymeric agglomerates containing water or solvent or both are freed from adhering moisture and contained solvent, accompanied by melting, in an apparatus provided with rotating baffles for cleaning the walls of the apparatus and for distribution and transport of the material being dried, by heat input through the walls or through the rotating baffles or both as well as by heat input as a result of shearing action. The process of drying and that of melting for the subsequent granulation are thereby combined.

10 Claims, 4 Drawing Sheets

PROCESS FOR DRYING POLYMERIC POWDERS AND POLYMERIC AGGLOMERATES

The invention relates to a process for drying thermoplastic polymeric powders and polymeric agglomerates, in particular aromatic polycarbonate (PC) or other thermoplastic polymers such as, for example, acrylonitrile-butadiene-styrene (ABS) copolymer, in the melt, whereby thermoplastic polymeric powders or polymeric agglomerates containing water or solvent or both are freed from adhering moisture and contained solvent, accompanied by melting, in an apparatus provided with rotating baffles for cleaning the walls of the apparatus and for distribution and transport of the material being dried, by heat input through the walls or through the rotating baffles or both as well as by heat input as a result of shearing action. The process of drying and that of melting for the subsequent granulation are thereby combined.

The extrusion of undried polycarbonate powder from separation processes is described in the published patent EP 300 485. Here the water moisture content of the powder is given as 0.5 to 10 wt. % and the solvent content as 0.01 to 5 wt. %. The advantage of this process is the lowering of the particle content.

In the published patent JP 6216905 the extrusion of undried powder to form microgranules, which can be dried easily, is described. Here drying takes place in the solid phase.

The removal from polycarbonate powders of volatile impurities without thermal damage and with the preservation of good colour indexes is successfully achieved by the addition of from 0.1 to 20 wt. % of water prior to the melting in screw extruders or kneaders in order to produce granular materials (see, for example, JP 61221225, JP 01249834, JP 60184814).

The use of water in a polycarbonate melt by injection into an extruder in order to remove volatile constituents from the polycarbonate and to obtain better colour indexes is described in the documents EP 435023 and JP 62294528.

In the above-mentioned processes the drying of the polymer (here polycarbonate) is not prominent, but rather the removal of volatile compounds such as residual solvent and the use of water to stabilise the polymer in the melt.

The polycarbonates obtained by these processes, however, still do not exhibit an entirely satisfactory residual content of solvents in the polycarbonate. Moreover, the drying in extruders or kneaders of powders containing water moisture at a moisture content of >5 wt. %, owing to the high dynamic pressures of the vapours which occur in this low-volume apparatus, is associated on the manufacturing scale with a drastic lowering of the throughput, which renders such processes uneconomic.

The additional technical problems which occur during the drying of moist thermoplastics in screw extruders are explained below.

The water in the thermoplastics is usually present as a separate phase (not adsorbed) in the pores. On attaining the evaporation temperature, which is already below the glass temperature in, for example, the thermoplastic polycarbonates, and having acquired an adequate energy input, the water appears to evaporate suddenly. As a result of the formation of large volumes of gas, a high dynamic pressure arises in a short time within apparatus such as, for example, screw extruders, which have a small free available volume and a smaller gas permeability. This high dynamic pressure gives rise to a "vacuum cleaner effect", which results in the polymeric powder or polymeric agglomerate to be dried being entrained by the withdrawn vapours. The entrainment can be avoided in the said apparatus only if the throughput is drastically lowered or else the evaporation of the water or of the solvent is extended in time and in situ—in continuous operation—by the application of a pressure gradient. The lowering of the throughput is uneconomic and the application of a pressure gradient results in a more elevated drying temperature or in a prolonged drying time and consequently in a deterioration in the quality of the product, for example, due to thermal damage, which becomes noticeable by a decrease in viscosity and, for example, by a deterioration of the colour index of PC, characterised by the so-called yellowness index.

It was the object of the invention to find an efficient drying process which does not have the disadvantages of the prior art and in particular renders possible a continuous drying with a high throughput of polymers.

It has been found that, with the aid of modified mixers of large volume, for example, modified single-shaft or twin-shaft kneaders corresponding to those in the documents EP 460 466 or EP 528 21 A1, polymeric melts, for example, of polycarbonate (PC) or ABS are successfully dried and processed at high viscosity and with an economic throughput, when the rotors, the drive unit and in particular the bars attached to the rotors are reinforced. In addition the standard ratio of revolutions, which in the case of twin-shaft mixers in reverse rotation is 1:4, is altered for economic use, owing to the then integrally higher energy input, for example, to preferably 1:1.

It has moreover been found that the removal of residual solvents from polymeric powders or polymeric agglomerates, in particular of ABS or PC, succeeds particularly effectively and economically by means of a two-stage process, namely, drying off the solvent moisture by the passage through of steam and the subsequent drying of the powder moist from water or the agglomerates moist from water in the melt. It has also been found that the drying of the polymeric powders or polymeric agglomerates, which contain up to 50 wt. % of water, in the melt yields a polymeric granular material having a better colour index than that attained by the drying process conventionally used hitherto, whereby, for example, polycarbonate powders or polycarbonate agglomerate in solid phase are freed from water moisture and solvent moisture by drying, for example, in a contact dryer and are subsequently converted into granular material by extrusion in an extruder. It has also been found that the drying process can be carried out economically at an elevated temperature, without there being observed a thermal decomposition of the polymer, associated with deterioration in its properties, for example, the deterioration in the colour index or a decrease in molecular weight. In addition it has been found that the drying can be carried out with a higher throughput at a moisture content of up to 50 wt. % of water, owing to the greater gas permeability of the apparatus used according to the invention, without the pulverulent particles or droplets being entrained by the stream of vapour.

The invention provides a process for drying thermoplastic polymeric powders and polymeric agglomerate, in particular aromatic polycarbonate (PC) or other thermoplastic polymers such as, for example, acrylonitrile-butadiene-styrene (ABS) copolymer, in the melt, whereby the polymeric powders or polymeric agglomerates which are moist from water or solvent, or moist from water and solvent, and have a water content of from 1 to 50 wt. %, preferably of from 5 to 40 wt. %, and a content of solvent and accompanying substances of from 0 to 70 wt. %, preferably of from 0.1 to 20 wt. %, optionally after a steam stripping for the removal of organic accompanying substances volatile in steam, are dried, accompanied by melting, in a drying and mixing apparatus, characterised in that a mixer is used which is provided with rotating baffles for the mechanical cleaning of the walls of the apparatus and for the transport of material, with the polymer being dried as a result of the heating of the casing or the heating of the rotating baffles or the heating of the casing and the rotating baffles and as a result of the shearing action caused by the baffles moving in the material to be dried, with simultaneous melting, with the temperature for the heating of the apparatus walls and the baffles being from 150° to 400° C., preferably from 200° to 300° C. and particularly preferably from 240° to 280° C., and with the drying taking place at an internal pressure of from 1 mbar to 5 bar, preferably at normal pressure, optionally also by the addition of inert gas or steam, the residence time is from 5 to 90 minutes, preferably from 5 to 20 minutes and the integral energy input, as specific kneading energy referred to the discharged throughput, is from 0.01 to 1 kWh per kg of dried polymeric melt, preferably from 0.05 to 0.5 kWh/kg and particularly preferably from 0.1 to 0.3 kWh/kg, of anhydrous and solvent-free polymeric melt.

Solvents for the thermoplastic polymers according to the invention are all organic solvents which dissolve the polymer to the extent of at least 5 wt. %, in particular methylene chloride, chlorobenzene, toluene, tetrahydrofuran or 1,3-dioxolane as well as mixtures of the above-mentioned solvents, particularly preferably dichloromethane.

Accompanying substances according to the invention are, for example, precipitating agents such as aliphatic $C_4$–$C_{12}$ hydrocarbons, in particular pentane, hexane, cyclohexane and heptane or even residual monomers not converted to polymers, in particular such as styrene, acrylonitrile or butadiene.

Suitable thermoplastic polymers which can be dried by the process according to the invention are, for example, polycarbonate, polyester carbonate, polyalkylene terephthalate, EPDM polymers, polystyrene or polystyrene copolymers or polystyrene graft polymers, for example, with acrylonitrile and sytol such as ABS in particular.

Preferred thermoplastic polymers are aromatic polycarbonate and ABS.

Thermoplastic aromatic polycarbonates which are used for the purpose of the process according to the invention are aromatic homopolycarbonates, copolycarbonates and mixtures of these polycarbonates, which are derived in particular from the following diphenols:

hydroquinone, resorcinol, dihydroxydiphenyl, bis (hydroxyphenyl)alkanes, bis(hydroxyphenyl) cycloalkanes, bis(hydroxyphenyl)sulphides, bis (hydroxyphenyl)ethers, bis(hydroxyphenyl) sulphoxides, bis(hydroxyphenyl)sulphones and α,α'-bis(hydroxyphenyl)diisopropylbenzenes as well as ring-alkylated and ring-halogenated compounds thereof.

Suitable diphenols are described, for example, in the U.S. patents U.S. Pat. No. 3,028,365, U.S. Pat. No. 2,999,835, U.S. Pat. No. 3,062,781, U.S. Pat. No. 3,148,172 and U.S. Pat. No. 4,982,014, in the Deutsche Offenlegungsschriften DE 1 570 703 and DE 2 063 050 as well as in the monograph by H. Schnell, "Chemistry and Physics of Polycarbonates", Interscience Publishers, New York, 1964.

Preferred diphenols are:
4,4'-dihydroxydiphenyl,
2,2-bis(4-hydroxyphenyl)propane,
2,4-bis(4-hydroxyphenyl)-2-methylbutane,
1,1-bis(4-hydroxyphenyl)cyclohexane,
α,α'-bis(4-hydroxyphenyl)-p-diisopropylbenzene,
α,α'-bis(4-hydroxyphenyl)-m-diisopropylbenzene,
2,2-bis(3-methyl-4-hydroxyphenyl)propane,
2,2-bis(3-chloro-4-hydroxyphenyl)propane,
bis(3,5-dimethyl-4-hydroxyphenyl)methane,
2,2-bis(3,5-dimethyl-4-hydroxyphenyl)propane,
bis(3,5-dimethyl-4-hydroxyphenyl) sulphone,
2,4-bis(3,5-dimethyl-4-hydroxyphenyl)-2-methylbutane,
1,1-bis(3,5-dimethyl-4-hydroxyphenyl)cyclohexane,
α,α'-bis(3,5-dimethyl-4-hydroxyphenyl)-p-diisopropylbenzene,
1,1-bis(4-hydroxyphenyl)-3,3,5-trimethylcyclohexane,
1,1-bis(4-hydroxyphenyl)-3-methylcyclohexane,
1,1-bis(4-hydroxyphenyl)-3,3-dimethylcyclohexane,
1,1-bis(4-hydroxyphenyl)-4-methylcyclohexane,
2,2-bis(3,5-dichloro-4-hydroxyphenyl)propane,
2,2-bis(3,5-dibromo-4-hydroxyphenyl)propane,
1,1-bis(4-hydroxyphenyl)-1-phenylethane,
2,2-bis(3,5-dimethyl-4-hydroxyphenyl)-2-phenylethane,
2,2-bis(4-hydroxyphenyl)-2,2-diphenylethane,
9,9-bis(4-hydroxyphenyl)fluorene,
9,9-bis(3,5-dimethyl-4-hydroxyphenyl)fluorene.

Particularly preferred diphenols are, for example:
2,2-bis(4-hydroxyphenyl)propane,
2,2-bis(3,5-dimethyl-4-hydroxyphenyl)propane,
1,1-bis(4-hydroxyphenyl)cyclohexane,
1,1-bis(4-hydroxyphenyl)-1-phenylethane,
1,1-bis(4-hydroxyphenyl)-3,3,5-trimethylcyclohexane,
1,1-bis(4-hydroxyphenyl)-3-methylcyclohexane,
1,1-bis(4-hydroxyphenyl)-4-methylcyclohexane,
9,9-bis(3,5-dimethyl-4-hydroxyphenyl)fluorene.

In particular 2,2-bis(4-hydroxyphenyl)propane, 1,1-bis(4-hydroxyphenyl)-3,3,5-trimethylcyclohexane and 1,1-bis(4-hydroxyphenyl)-1-phenylethane are preferred.

Any mixtures of the above-mentioned diphenols may also be used.

For the purpose of improving the flow behaviour, small quantities, preferably quantities of between 0.05 and 2.0 mol-% (referred to moles of diphenols used), of trifunctional or more than trifunctional compounds, in particular those having three or more than three phenolic hydroxyl groups, may also be used concomitantly in the known manner in the synthesis of the PC. Examples of some usable compounds are:

1,3,5-tris(4-hydroxyphenyl)benzene,
1,3,5-tris(4-(4-hydroxyphenylisopropyl)phenyl)benzene,
1,1,1-tris(4-hydroxyphenyl)ethane,
2,6-bis(2-hydroxy-5'-methylbenzyl)-4-methylbenzene,
2-(4-hydroxyphenyl)-2-(2,4-dihydroxyphenyl)propane,
hexakis(4-(4-hydroxyphenylisopropyl)phenyl) orthoterephthalate,
tetrakis(4-hydroxyphenyl)methane,
1,4-bis((4,4"-dihydroxytriphenyl)methyl)benzene,
3,3-bis(4-hydroxyphenyl)-2-oxo-2,3-dihydroindole,
3,3-bis(4-hydroxy-3-methylphenyl)-2-oxo-2,3-dihydroindole.

Also suitable are the chloroformic esters corresponding to these compounds, as well as the acids or preferably the acid chlorides of more than dibasic aliphatic or aromatic carboxylic acids, that is, for example, 2,4-dihydroxybenzoic acid, or 2,4-dihydroxybenzoyl dichloride,
trimesic acid, or trimesic trichloride,
trimellitic acid, or trimellitic trichloride,
cyanuric trichloride;

these branching agents may be added separately or placed in the mixture or added in portions to the synthesis.

The chain stoppers used in the polycarbonate synthesis may be phenols, optionally substituted phenols, the chloroformic esters and monocarboxylic acids thereof, as well as the acid chlorides thereof, preferably cumylphenol, p-tert. butylphenol and i-octylphenol optionally as mixtures, containing the usual impurities and isomers; the chain stoppers can be added separately or placed in the mixture with the diphenols or added in portions to the synthesis.

The preparation of the polycarbonates or polycarbonate mixtures available for the drying process according to the invention can be carried out, for example, by the following known methods (cf. H. Schnell, "Chemistry and Physics of Polycarbonates", Polymer Review, Vol. IX, page 27 ff., Interscience Publishers, New York, 1964).

1. By the Melt Transesterification Method

In the melt transesterification method, the molecular weight is condensed with the addition of diphenyl carbonate in stoichiometric quantities or in an excess of up to 40 wt. %, with continuous removal by distillation of phenol and if necessary of the excess diphenyl carbonate. This method is carried out with the use of conventional catalysts such as alkali metal ions, for example, ions of Li, Na, K, or transition metal compounds, for example, those based on Sn, Zn, Ti, as a single-stage or two-stage process, that is, with a possible separate condensation of the oligomers and the polymer.

2. By the Solution Method in Disperse Phase, the so-called "Two-Phase Interface Process"

Here the diphenols to be used are dissolved in aqueous alkaline phase. To this are added the chain stoppers required for the preparation of the polycarbonates according to the invention, in quantities of from 1.0 to 20.0 mol.-%, referred to moles of diphenol, optionally dissolved in an aqueous alkaline phase, preferably sodium hydroxide solution, or are added in solid form to this and to an inert organic phase. The mixture is then reacted with phosgene in the presence of an inert, preferably polycarbonate-dissolving, organic phase. The reaction temperature is between 0° C. and 50° C.

The required chain stoppers and branching agents may also be added during the phosgenation or, as long as chloroformic esters are present in the reaction mixture, in solid form, as a melt, as a solution in alkali or inert organic solvents.

The reaction can be accelerated by catalysts such as tertiary amines or onium salts. Tributylamine, triethylamine and N-ethylpiperidine are preferred.

In addition to or instead of diphenols, the chloroformic esters or bischloroformic esters thereof or both may be used initially or added during the synthesis.

Suitable solvents are, for example, methylene chloride, chlorobenzene, toluene and mixtures thereof.

The polycarbonates preferably used can also be isolated from their solutions by generally known methods, for example, by spray evaporation or by precipitation.

Thus the patent specification U.S. Pat. No. 3,508,339 describes the use of a special nozzle in combination with a mixing chamber, wherein the polycarbonate solution and steam are combined, and with a connecting tube of constant diameter, wherein the solvent is dried. The pulverulent agglomerate obtained contains water and residual solvent, which is removed by drying in the solid phase. Similar methods involving pulverulent agglomerates are described in the documents U.S. Pat. No. 4,568,418 and in EP 0 616 002 A1 (21.9.94).

By means of these processes polycarbonate particles are obtained which are largely freed from organic solvent but which have a water content about 40 wt. % and have therefore to be dried for further use. In the conventional drying processes residual solvents and water moisture are removed by drying in solid phase, for example, in contact dryers, fluidised bed dryers or tower dryers. The dried polycarbonates are then extruded to form granular material and this granular material, optionally after the addition of additives, dyes, fillers or glass fibres, is processed in a known manner by injection moulding to form various articles.

The removal of the solvent can be carried out in the process according to the invention in one drying process arranged in series or else advantageously by the passage through of steam.

The melt is transported out of the drying apparatus by means of screw extruders or gear pumps and is shaped into strands and granulated by being pressed through nozzles, optionally after the melt has been screened to remove interfering particles.

The granular materials obtained as a result of this combined process in the process according to the invention are distinguished by an extremely low content of residual solvent, good colour indexes and a high bulk density. The drying process is very economical because the volume of the apparatus can be kept small owing to the conversion of the voluminous powders or the voluminous agglomerates of low bulk density into a melt having a high density. The transfer during this procedure of the quantity of heat required for the drying process is very satisfactory, because a large temperature difference can be applied without this leading—as a result of the transition into the melt of the material to be dried—to the thermal decomposition of the product.

In the drying apparatus to be used according to the invention the above-mentioned risk observed in extruders, of entrainment of polymeric particles, does not exist, as it is an apparatus of large volume, wherein the baffles have a high permeability to gases and the transverse sections of the vapours are sufficiently large.

The drive part including the rotating baffles in the modified mixing apparatus according to the invention must have an adequate mechanical stability in order to control the shear forces arising during the plasticisation and the additionally arising binding forces in relation to the free movement of the walls in the case of large agglomerates. The viscosity of pure melts, for example, of polycarbonate of medium viscosity usual on the market is above 10,000 Pa.s at a temperature of below 300° C. Through an unavoidable and here even desired mixing of powder or agglomerate and melt during a continuous operation, locally high loads, which become apparent through peaks in the torque, are lowered. The integral energy input as specific kneading energy, referred to the discharged throughput in the form of dried melt, is so high that hitherto it has been achieved only in apparatus such as, for example, screw extruders which, as already explained above, on account of the high dynamic pressures owing to the vapours cannot be used economically in the drying process.

The polymer obtained by the drying process according to the invention is in granular form and can be processed in a known manner directly to form mouldings or by injection moulding to form various articles. Optionally additives, dyes, fillers or glass fibres may be added, prior to the drying process or during the drying process, to the polymeric powder to be dried or to the polymeric agglomerates to be dried.

In particular, for mainly non-transparent applications, another thermoplastic may be mixed in conventional quantities with polycarbonates, that is, for example, from 10 to 50 wt. %, referred to the polycarbonate, during or at the end of the drying process.

Other suitable thermoplastics are, for example, optionally aromatic polyester carbonates, polycarbonates based on bisphenols other than the above-mentioned polycarbonates, polyalkylene terephthalates, EPDM polymers, polystyrene and polystyrene copolymers and graft copolymers with acrylonitrile or acrylonitrile and butadiene, such as ABS in particular.

The dried polymeric granules are used in the conventional manner, for example, in the field of electrical engineering, optics, in the construction of vehicles and in the lighting industry.

Description of the drying apparatus which can be used according to the invention:—A device described, for example, in the patent specification U.S. Pat. No. 5,407,266, was modified for the use according to the invention. The bars of U-shape construction according to claims 1 and 2 of the patent U.S. Pat. No. 5,407,266, arranged on the shafts longitudinally in the apparatus, because of their excessively low mechanical stability were replaced by straight bars having a considerably enlarged transverse section. In addition the angle of the bars on the product side was altered from 90° for the former U-shaped bars to >90° for the new straight bars, in order to increase the scraping action of the bars.

The apparatus claimed in EP 0 460 466 A1 and in EP 0 528 210 A1, after corresponding adaptation, is also suitable in principle for the use according to the invention. The constructions described in the cited patents permit a modified form of bars having an adequate stability for the use according to the invention.

The figures described below represent Examples of the modified mixing apparatus used which are suitable for carrying out the process.

In the figures

Figure 2:
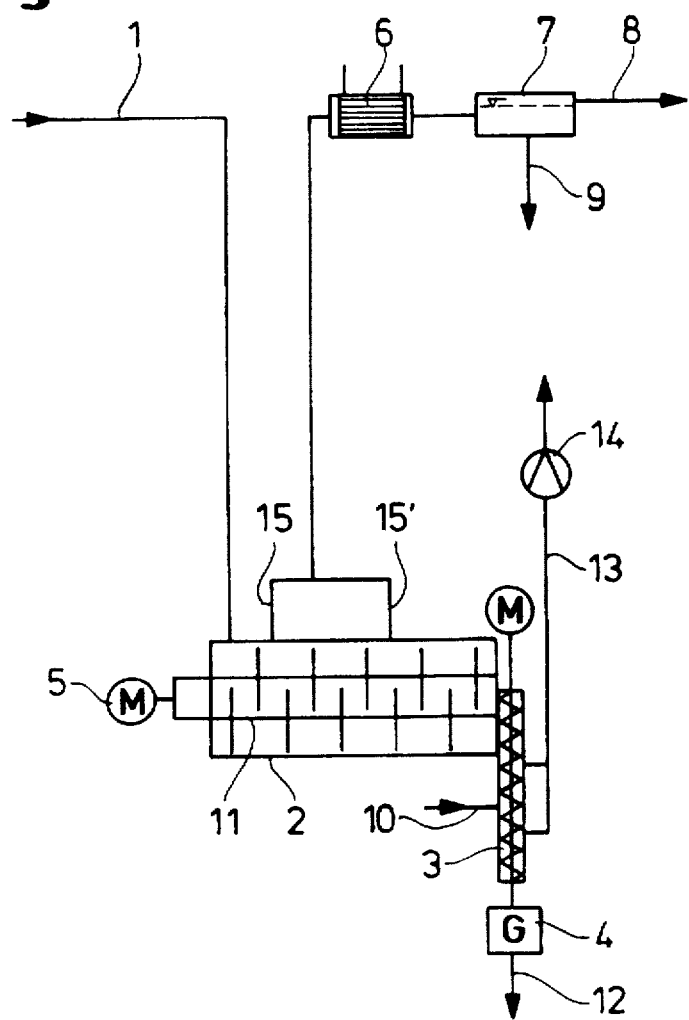
Figure 3A:
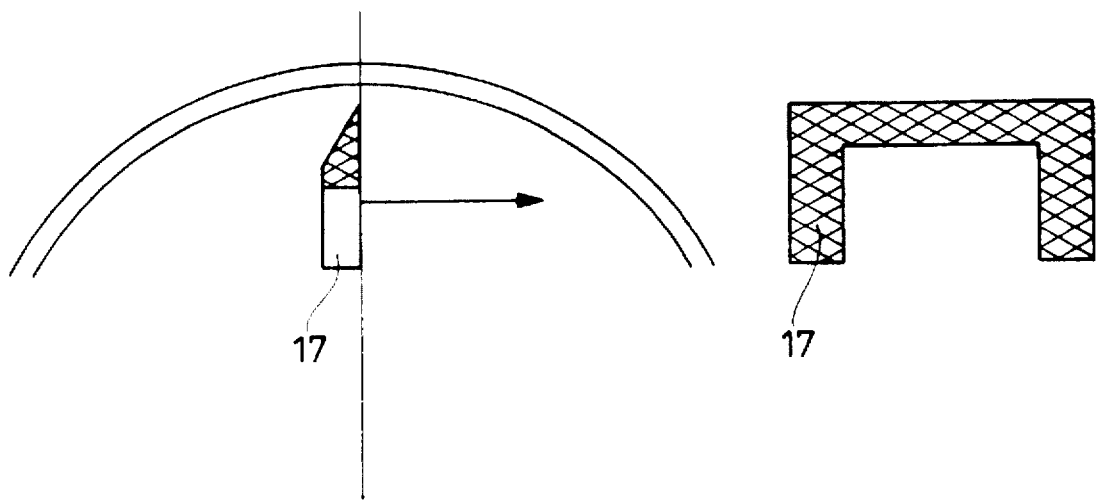
Figure 3B:
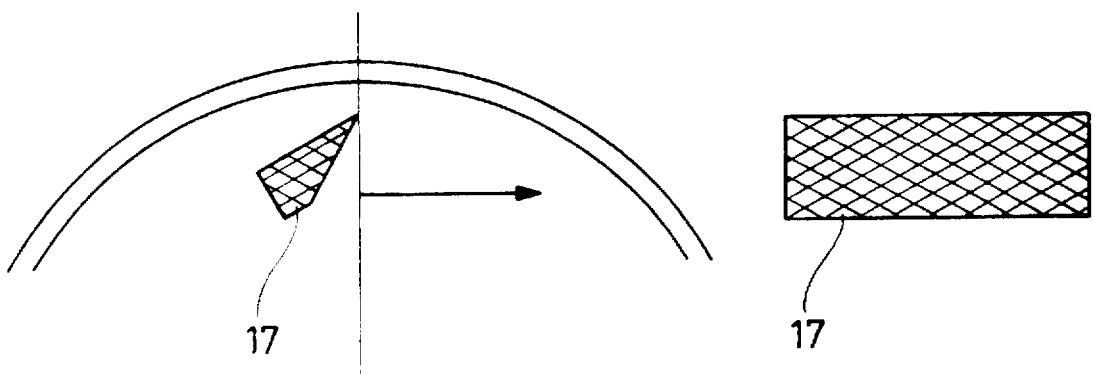
Figure 4A:
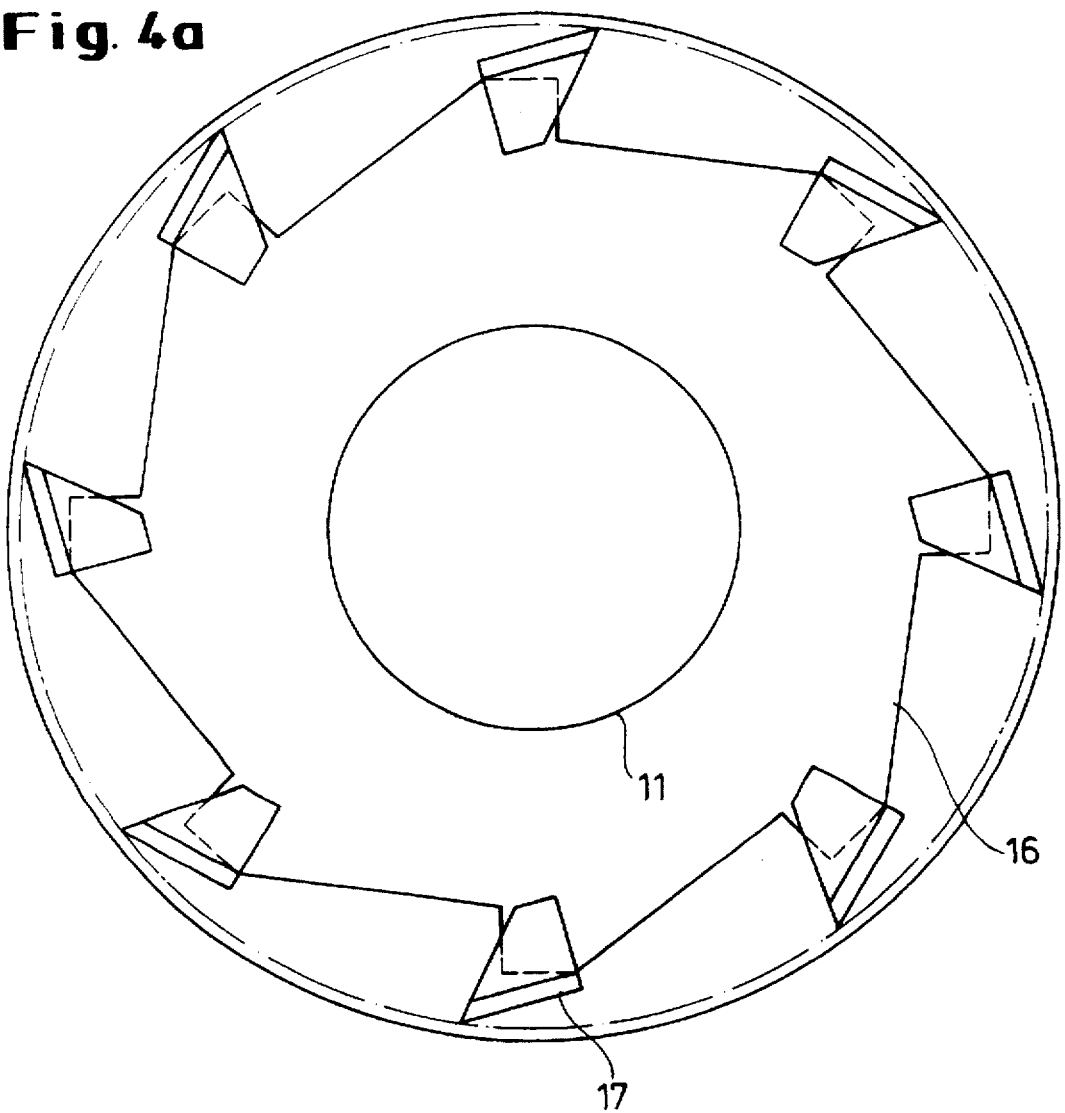
Figure 4B:
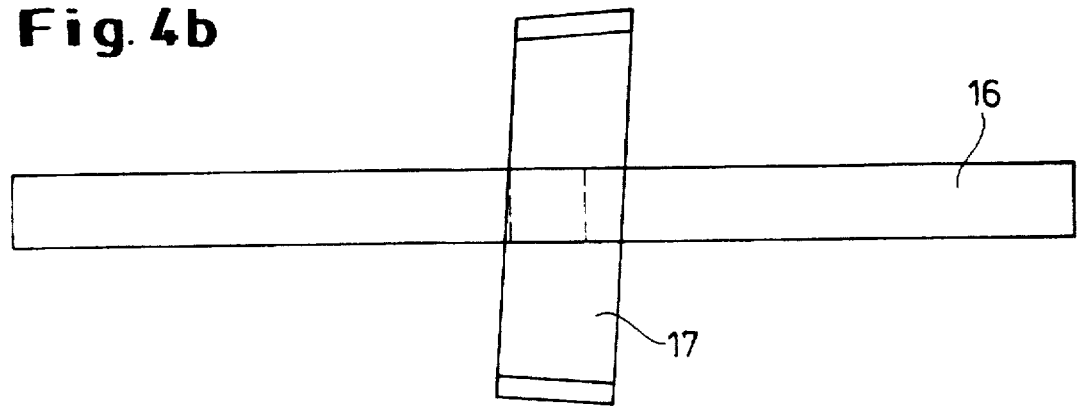

FIG. 1 shows a diagram of an arrangement of equipment for carrying out the process according to the invention FIG. 2 shows a drying arrangement compared with the arrangement in FIG. 1, supplemented by a discharge extruder FIG. 3a shows a diagrammatic section through a kneading bar of a known mixer/dryer FIG. 3b shows a diagrammatic section through a reinforced kneading bar used in the process according to the invention FIG. 4a shows a diagrammatic section in lateral view through a single-shaft mixer for the process according to the invention FIG. 4b shows a diagrammatic section through a scraping disc and a bar as in FIG. 4a, with the other kneading bars being omitted.

FIG. 1 shows a diagram of an arrangement for the carrying out of the process according to the invention. The polymeric agglomerate or polymeric powder 1 is measured into the mixer 2 equipped with motor 5, shafts 11 and kneading discs 16. Solvent 9 and water 8 are removed via the vapour outlets 15, 15', deposited in the condenser 6 and separated in the separator 7. FIG. 4a shows a transverse section through a modified shaft 11 together with a kneading disc 16 and reinforced kneading bars 17 located on the circumference of the latter. The top view on only one kneading disc 16 together with only one kneading bar 17 is reproduced in FIG. 4b. FIG. 3a shows the geometry of a kneading bar 17 of a known device in lateral view and front view. FIG. 3b shows a kneading bar 17 modified according to the invention having an enlarged angle on the product side. The polymeric melt is delivered via a pump 18 or a discharge extruder 3, which is equipped with an inert gas inlet 10 and vapour withdrawal 13 and pump 14, to a granulator 4, wherein the polymeric granular material 12 is produced.

EXAMPLES

Example 1

40 kg/h of a polycarbonate agglomerate having a water content of 42 wt. %, prepared by the method described in U.S. Pat. No. 3,508,339 from a solution of polycarbonate (Makrolon 2808, Bayer AG) in methylene chloride and freed from residual solvent by steam stripping, was measured by means of an oscillating chute into the front vapour outlet opening 15 (see FIG. 2) of a mixer 2 from the firm LIST (type LIST AP 12) having a volume of 30 l, the shafts 11 of which were reinforced. The casing and the shafts 11 of the mixing apparatus 2 were heated using a heating oil, the inlet temperature whereof was maintained constant at 250° C. Twenty minutes after commencement of the metered addition of the agglomerates into the LIST apparatus, melt was discharged continuously from the apparatus by means of the discharge screw 3 and pressed through a nozzle. The molten strand issuing from the nozzle was cooled in a water bath and granulated, 4. The sample of granular material 12 obtained after operation for four hours was analysed. The properties of the granular material are given in Table 1.

Example 2

50 kg/h of polycarbonate agglomerate was added as described in Example 1. The drying was carried out as described in Table 1. Here the starting material contained 29 wt. % of water and 0.1 wt. % of dichloromethane. The properties of the granular material obtained here are given in Table 1.

Example 3

30 kg/h of polycarbonate agglomerate was added as described in Example 1 and dried. In this case the starting material contained 38 wt. % of water. The temperature of the heating medium of the baffles in the apparatus and of the casing was maintained at 280° C. The properties of the granular material obtained here are given in Table 1.

Example 4

55 kg/h of polycarbonate agglomerate was added as described in Example 1. The starting material contained 17 wt. % of water. The properties of the granular material obtained here are given in Table 1.

Example 5

32 kg/h of crystalline polycarbonate powder was added as described in Example 1 and dried. The starting material contained 17 wt. % of water and 31.4 wt. % of dichloromethane. The temperature of the heating medium was maintained constant at 290° C. The properties of the granular material obtained here are given in Table 1.

Comparative Example 1

25 kg/h of polycarbonate agglomerate having a water content of 42 wt. % and a dichloromethane content of 4.9 wt. %, which had been obtained from dichloromethane solution by the spray evaporation method as cited in Example 1, was obtained continuously in a disc dryer at a temperature of the heating medium of 120° C. and extruded in a ZSK extruder. The granular materials obtained displayed the properties given in Table 1.

Comparative Example 2

The crystalline polycarbonate powder described in Example 5 was dried for 4 hours at 180° C. in a vacuum drying cabinet at a pressure of 12 mbar. The dried powder became partly sintered into the form of agglomerates. After these agglomerates had been comminuted to form coarse lumps, the dried polycarbonate was extruded in a ZSK extruder. The granular materials obtained displayed the properties given in Table 1.

TABLE 1

|  | Water content before drying (Wt. %) | Water content after drying (Wt. %) | MC* residual content after | Yellowness Index Y1 | Decrease in viscosity (Δ rel. viscosity) | Throughput of moist polycarbon |
|---|---|---|---|---|---|---|
| Example | 42.0 | <0.1 | <2 | 2.5 | <0.001 | 40 |
| Example | 29.0 | <0.5 | <2 | 2.8 | <0.001 | 50 |
| Example | 38.0 | <0.1 | <2 | 3.1 | <0.001 | 30 |
| Example | 17.0 | <0.1 | <2 | 2.1 | <0.001 | 35 |
| Example | 17.0 | <0.1 | <2 | 3.2 | <0.001 | 32 |
| Comparative | 42.0 | <0.1 | 4 | 6.3 | 0.005 | — |
| Comparative | 42.0 | <0.1 | <2 | 6.9 | 0.009 | — |

*MC = methylene chloride

We claim:

1. A process for drying thermoplastic polymeric powders or polymeric agglomerates, in particular polycarbonate, polyester carbonate, polyalkylene terephthalate, EPDM polymer, polystyrene or polystyrene copolymers or graft copolymers, in the melt, whereby the polymeric powders or polymeric agglomerates which are moist from water or solvent, or moist from water and solvent, and have a water content of from 1 to 50 wt. %, referred to the moist polymeric powder, and a content of solvent and accompanying substances of up to 70 wt. %, optionally after a steam stripping for the removal of organic solvents and accompanying substances volatile in steam, are dried, accompanied by melting of the polymer, in a drying and mixing apparatus, characterised in that a mixer is used which is provided with rotating baffles for the mechanical cleaning of the walls of the apparatus and for the transport of material, with the thermoplastic polymer being dried as a result of the heating of the casing or the heating of the rotating baffles or the heating of the casing and the rotating baffles and as a result of the shearing action caused by the baffles moving in the material to be dried, with simultaneous melting of the polymer, and the temperature for the heating of the apparatus walls and of the baffles is from 150° to 400° C., that the drying taking place at an internal pressure of from 1 mbar to 5 bar, the residence time is from 5 to 90 minutes, that the integral energy input, as specific kneading energy referred to the discharged throughput, is from 0.01 to 1 kWh per kg of dried polymeric melt.

2. The process according to claim 1, characterised in that the polymeric powders or polymeric agglomerates have a water content of from 5 to 40 wt. % and a content of solvents and accompanying substances of from 0.1 to 20 wt. %.

3. The process according to claim 1, characterised in that the temperature of the wall of the apparatus and of the baffles is from 200°0 to 300° C.

4. The process according to claim 1, characterised in that the drying is carried out at normal pressure, optionally also with the addition of inert gas or steam.

5. The process according to claim 1, characterised in that the residence time of the polymer in the mixer is from 5 to 20 minutes.

6. The process according to claim 1, characterised in that the integral energy input is from 0.05 to 0.5 kWh per kg of dry polymeric melt.

7. The process according to claim 1, characterised in that the thermoplastic polymer is an acrylonitrile-butadiene-styrene copolymer (ABS).

8. The process according to claim 1, characterised in that the thermoplastic polymer is an aromatic polycarbonate.

9. The process according to claim 3, wherein the temperature of the wall of the apparatus and the baffles is from 240° to 280° C.

10. The process according to claim 6, wherein the integral energy input is from 0.1 to 0.3 kWh per kg of dry polymeric melt.

* * * * *

UNITED STATES PATENT AND TRADEMARK OFFICE
CERTIFICATE OF CORRECTION

| | | |
|---|---|---|
| PATENT NO. | : | 5,786,445 |
| DATED | : | July 28, 1998 |
| INVENTOR(S) | : | Claus Wulff, et al. |

It is certified that error appears in the above-identified patent and that said Letters Patent is hereby corrected as shown below:

Column 10, line 27 (claim 3, line 3, "200°0" should read -- 200°--.

Signed and Sealed this

Twenty-second Day of December, 1998

Attest:

BRUCE LEHMAN

*Attesting Officer*   *Commissioner of Patents and Trademarks*